(12) United States Patent
Healy et al.

(10) Patent No.: US 7,550,041 B2
(45) Date of Patent: Jun. 23, 2009

(54) HIGHLY CONCENTRATED FLOWABLE PIGMENT COMPOSITION AND PROCESS FOR ITS MANUFACTURE

(75) Inventors: Thomas Healy, Paisley (GB); Lynda Cannon, Salcoats (GB); Tracy Murray, Irvine (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 11/666,130

(22) PCT Filed: Oct. 24, 2005

(86) PCT No.: PCT/EP2005/055471

§ 371 (c)(1),
(2), (4) Date: Apr. 24, 2007

(87) PCT Pub. No.: WO2006/048388

PCT Pub. Date: May 11, 2006

(65) Prior Publication Data

US 2007/0289501 A1 Dec. 20, 2007

(30) Foreign Application Priority Data

Nov. 1, 2004 (EP) .................................. 04105431
Aug. 4, 2005 (EP) .................................. 05107202

(51) Int. Cl.
*C09B 67/00* (2006.01)
*C09B 67/02* (2006.01)
*C09B 67/04* (2006.01)
*C09B 67/10* (2006.01)
*C09B 67/12* (2006.01)
*C09B 67/20* (2006.01)

(52) U.S. Cl. .................. 106/499; 106/31.6; 106/31.75; 106/31.76; 106/31.77; 106/31.78; 106/31.79; 106/31.8; 106/31.85; 106/402; 106/410; 106/412; 106/413; 106/419; 106/420; 106/429; 106/433; 106/447; 106/450; 106/452; 106/453; 106/455; 106/460; 106/471; 106/476; 106/479; 106/480; 106/493; 106/496; 106/497; 106/498; 106/500; 106/502; 430/105; 524/81; 524/88; 524/401

(58) Field of Classification Search ................ 106/31.6, 106/31.75, 31.76, 31.77, 31.78, 31.79, 31.8, 106/31.85, 410, 412, 413, 493, 496, 497, 106/498, 499, 402, 419, 420, 429, 433, 447, 106/450, 452, 453, 455, 460, 471, 476, 477, 106/479, 480, 500, 502, 105; 524/81, 88, 524/401

See application file for complete search history.

(56) References Cited

U.S. PATENT DOCUMENTS

| 3,004,986 | A | 10/1961 | Kirby et al. | 260/314.5 |
| 4,386,967 | A | 6/1983 | Ramaglia | 106/309 |
| 5,530,115 | A | 6/1996 | Iuchi et al. | 540/141 |
| 5,725,984 | A | 3/1998 | Yamasaki et al. | 430/58 |
| 5,831,083 | A | 11/1998 | Ohno et al. | 540/141 |
| 5,964,929 | A | 10/1999 | Langley et al. | 106/31.66 |
| 6,031,030 | A | 2/2000 | Langley et al. | 524/88 |
| 2005/0119369 | A1 | 6/2005 | Imagawa et al. | 523/160 |

FOREIGN PATENT DOCUMENTS

| DE | 1411880 | 10/1975 |
| DE | 27 14 778 | 10/1978 |
| DE | 101 52 136 | 5/2003 |
| NL | 254042 | 7/1960 |
| WO | 2005/075577 | 8/2005 |

OTHER PUBLICATIONS

English language abstract No. 90:24789of DE 27 14 778.
English language abstract No. 138:370358 of DE 101 52 136.

*Primary Examiner*—Anthony J Green
(74) *Attorney, Agent, or Firm*—Joseph C. Suhadolnik

(57) ABSTRACT

The invention pertains to a highly concentrated pigment comprising
from 75 to 95% by weight, preferably from 78 to 95% by weight, most preferred from 80 to 95% by weight, based on the weight of the composition, of a pigment;
from 0 to 20% by weight, preferably from 5 to 18% by weight, based on the weight of the composition, of a resin;
the total of pigment and resin being from 85 to 98% by weight of the composition; and
from 1 to 15% by weight, preferably from 2 to 15% by weight, most preferably from 5 to 15% by weight, based on the weight of the composition, of a $C_{10}$-$C_{18}$ alcohol, a liquid hydrocarbon having a boiling point higher than 80° C. at $10^5$ Pa, or both a $C_{10}$-$C_{18}$ alcohol and a liquid hydrocarbon having a boiling point higher than 80° C. at $10^5$ Pa.

Also claimed are a process for its manufacture, comprising dry-milling, blending and kneading the components, and the use of the pigment concentrates for the preparation of a masterbatch, ink, coating, plastic material, toner or colour filter.

20 Claims, No Drawings

HIGHLY CONCENTRATED FLOWABLE PIGMENT COMPOSITION AND PROCESS FOR ITS MANUFACTURE

The invention pertains to a conditioning process for crude pigments, wherein a crude pigment is extruded or kneaded in the presence of low amounts of a higher aliphatic alcohol and/or a higher liquid hydrocarbon and optionally a resin and other components. The concentrate thus obtained has a very high pigment level and the consistence of a powder. Its handling and its incorporation into further pigment preparations such as masterbatches (for example granulates, pastes, dispersions) or into ready for use compositions such as inks and coatings are very easy and lead to excellent results, in particular with respect to rheology, especially flow. Final articles obtained therefrom exhibit brilliant, homogeneous colorations of high colour strength.

U.S. Pat. No. 3,004,986 discloses the use of $C_5$-$C_{12}$ alcohols as an after-treatment agent for phthalocyanine pigments. The crude pigment is acid pasted to a finely divided form, which is suspended into water containing a minor amount of the alcohol and heated with live steam. The pigment is then isolated from the slurry.

NL-254 042 discloses a process for conditioning dioxazine pigments through salt kneading. Lauryl alcohol is used in combination with a much larger amount of glycerin or chemically modified molasse. The pigment is then isolated from the kneaded mass and dried.

U.S. Pat. 4,386,967 discloses the pretreatment of dry pigments through spraying with a solvent before incorporation in a liquid medium to improve its dispersibility. In the examples, inks comprising 77.78% of pigment, 14.44% of a polyester resin and 7.78% of tridecanol are prepared with two passes on a three-roll mill.

EP0 290 108A1 discloses a process for producing a printing-ink stock, wherein a pigment, a thermoplastic resin and a diluent are treated in an extruder. The proportions of pigment, thermoplastic resin and diluent are generally 15-40%, 40-70% and 8-15%, respectively. The diluent is for example a mineral oil, but the pigment particles are not comminuted. The printing ink stock is a more or less viscous, liquid, stable product in which the pigment is dispersed.

EP0 350 687 A2 discloses a process for transforming crude copper phthalocyanine into a pigmentary form, wherein the crude with highly agglomerated particles of primary particle size below 0.1 µm is wet-milled in an optionally aqueous solvent under high shear, followed by addition of water, isolation and drying. The pigment concentration is from 15 to 55% by weight and there is no binder.

EP 0 392 334 A2 discloses dry-milling crude copper phthalocyanine in the presence of from 0.5 to 10% binder, based on the total amount of binder in the final ink to be produced. The dry-milled product is then blended with the other ink ingredients in a dissolver, followed by several passes through a pearl mill. This process is not very efficient according to DE 101 52 136A1.

EP 0 774 494 A1 discloses a process for the production of ink concentrates, wherein a crude metal phthalocyanine is milled then kneaded together with an ink vehicle comprising one or more ink solvents. The concentration range for the pigment is from 20 to 80%, but all examples use concentrations of about 40 to 50%, together with about 30 to 80% of resin, based on the pigment. The pigment is dispersed in the ink solvent, thus forming a viscous fluid paste. Cetyl alcohol and petroleum distillate are used as ink solvents in a total amount of at least 23% (example 15), with a higher amount of petroleum distillate excepted in example 8 wherein a large amount of a hyperdispersant is added to increase the fluidity.

EP 0 780 446 A1 discloses a process for the production of pigments, wherein crude pigments are kneaded in the presence of a liquid carboxylic acid and optionally a salt, such as sodium chloride. However, this method has the disadvantage that the resulting pigment must be washed salt-free and the liquid carboxylic acid must be disposed of or purified for recycling.

EP 0 783 029 A1 discloses a method for producing a β-type copper phthalocyanine pigment, comprising the steps of wet-milling the reaction mixture consisting of the crude pigment and an organic solvent, then removing the organic solvent preferably by steam distillation. The pigment is finally isolated by washing, filtration and drying. As organic solvents, there are used for example an aromatic hydrocarbon, decalin, nitrobenzene or trichlorobenzene. The process is disclosed to be preferable to processes wherein the isolated crude pigment is mechanically ground and to provide an excellent dispersibility.

DE 19641 768 A1 discloses a process for extruding pastes, wherein all components are homogenized, dispersed and wetted continuously in the extruder without any premixing step. The examples illustrate the use of from 40 to 70% of unspecified colour pigments and a mixture of three binders each of different type. The product is especially a ready for use printing ink.

EP 0 878 518 A2 discloses a process highly similar to that of EP 0 774 494 A1, but leading to a paint concentrate.

WO 99/54410 A1 discloses a process for the preparation of a β copper phthalo-cyanine pigment, wherein crude copper phthalocyanine is first dry- or wet-milled, then isolated and conditioned in the presence of organic solvents and an aqueous base. The finished pigment is always finally isolated and dried.

DE 101 52 136 A1 teaches away from the use of expensive long chain alcohols in amounts of from 0.5 to 10%, which are allegedly utterly prejudicial at least for offset printing. It also discloses that the resin amount according to EP 0 392 334 A2 is too low and that the binder systems of EP 0 878 518 A2 (which choice indeed also includes the preferred resins of EP0 774 494 A1) lead to products useless for the preparation of ink concentrates.

Thus, DE 101 52 136 A1 excludes entirely the presence of aliphatic alcohols having at least 12 carbon atoms or carboxylic acids having at least 4 carbon atoms as well as the presence of >0.5% of other monofunctional alcohols. Instead and in analogy with flushing processes, there is added from 2 to 70%, preferably 10 to 70% of water, especially above 30% of water in order to enable at least 60% of the added water to be separated together with any impurities and the preferably added milling salt. The use of pigments containing about 0.5% of residual moisture is recommended. The use of finished pigments is disclosed not necessarily to be required, but the product of example 2 starting from crude copper phthalocyanine is said not to be universally useful for oil printing inks, in contrast to the product of example 2a starting from commercially available, pigmentary β copper phthalocyanine. Moreover, a copper phthalocyanine is not converted to β copper phthalocyanine in the absence of toluene (example 3).

EP 1 277 808 A2 discloses easily distributable pigment compositions comprising up to 90% pigment in an urea-aldehyd resin, which are obtained through extrusion, crushing, and optionally grinding and/or sieving. This process starts from already conditioned pigments and the product requires a mechanical post-treatment such as milling.

Examples 1 and 4 lead to solid particles comprising 80% by weight of C.I. Pigment Yellow 184 (bismuth vanadate) and 75% by weight of C.I. Pigment Yellow 34 (lead chromate), respectively. Such concentrations, however, are not reached with organic pigments, which moreover show only very slight improvements in colour strength (and also in saturation for β copper phthalocyanine).

It has now surprisingly been found that it is possible to use the methods known for the production of pastes or dispersions while decreasing the amount of resin and solvents. At a certain level, the concentrate has no more the consistence of a paste but collapses into particles much easier to handle while surprisingly of excellent dispersibility and coloristic properties. The collection of particles thus obtained is advantageously generally free flowable.

Hence, the invention pertains to a pigment composition comprising
from 75 to 95% by weight, preferably from 78 to 95% by weight, most preferred from 80 to 95% by weight, based on the weight of the composition, of a pigment;
from 0 to 20% by weight, preferably from 5 to 18% by weight, based on the weight of the composition, of a resin;
the total of pigment and resin being from 85 to 98% by weight of the composition; and
from 1 to 15% by weight, preferably from 2 to 15% by weight, most preferably from 5 to 15% by weight, based on the weight of the composition, of a $C_{10}$-$C_{18}$ alcohol, a liquid hydrocarbon having a boiling point higher than 80° C. at $10^5$ Pa, or both a $C_{10}$-$C_{18}$ alcohol and a liquid hydrocarbon having a boiling point higher than 80° C. at $10^5$ Pa.

The pigment composition may optionally also comprise from 0 to 8% by weight, based on the weight of the pigment, of further components.

The pigment may be inorganic or preferably organic, for example pigments of the 1-aminoanthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone or thioindigo series, including those, where applicable, in the form of metal complexes or lakes, in particular unsubstituted or partially halogenated phthalocyanines such as copper, zinc or nickel phthalocyanines, 1,4-diketo-3,6-diaryl-pyrrolo[3,4-c]pyrroles, dioxazines, isoindolinones, indanthrones, perylenes and quinacridones. Azo pigments may be, for example, mono- or dis-azo pigments from any known sub-class, obtainable, for example, by coupling, condensation or lake formation. With particular preference, the pigment is a phthalocyanine pigment, most preferred β copper phthalocyanine (Colour Index Pigment Blue 15:3 or 15:4).

Examples of inorganic pigments are carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite and bismuth vanadate. Because of their higher specific surface area, inorganic pigments are in general preferably present in higher concentrations than organic pigments, such as from 82 to 95% by weight inorganic pigment, based on the weight of the composition.

The pigment can also be a mixture of pigments of different chemical and/or crystallographic structure, including mixtures of organic pigments, mixtures of inorganic pigments as well as mixtures of organic and inorganic pigments, for example mixtures comprising from 1 to 99% by weight of one or more organic pigments and 1 to 99% by weight of one or more inorganic pigments, preferably from 10 to 99% by weight of an organic pigment and 1 to 90% by weight of an inorganic pigment, especially from 50 to 99% by weight of an organic pigment and from 1 to 50% by weight of an inorganic pigment. Mixtures of inorganic and organic pigments as described for example in U.S. Pat. No. 5,976,238. When the pigment comprises two or more chemically different compounds and/or two or more crystallographically different phases, these can be simple physical mixtures or form solid solutions, mixed crystals or even different phases coexisting within the same particle.

Notably useful are the pigments described in the Colour Index, including Pigment Yellow 1, 3, 12, 13,14,15, 17, 24, 34, 42, 53, 62, 73, 74, 83, 93, 95, 108, 109, 110, 111, 119, 120, 123, 128, 129, 139, 147, 150, 151, 154, 164, 168, 173, 174, 175, 180, 181,184, 185, 188, 191, 191:1,191:2, 193, 194 and 199; Pigment Orange 5, 13, 16, 22, 31, 34, 40, 43, 48, 49, 51, 61, 64, 71, 73 and 81; Pigment Red 2, 4, 5, 23, 48, 48:1, 48:2, 48:3, 48:4, 52:2, 53:1, 57, 57:1, 88, 89,101, 104, 112,122, 144, 146, 149, 166, 168, 170, 177, 178, 179, 181, 184, 185, 190, 192, 194, 202, 204, 206, 207, 209, 214, 216, 220, 221, 222, 224, 226, 242, 248, 254, 255, 262, 264, 270 and 272; Pigment Brown 23, 24, 25, 33, 41, 42, 43 and 44; Pigment Violet 19, 23, 29, 31, 37 and 42; Pigment Blue 15, 15:1,15:2, 15:3, 15:4, 15:6, 16, 25, 26, 28, 29, 60, 64 and 66; Pigment Green 7,17, 36, 37 and 50; Pigment White 6, 6:1 and 7; Pigment Black 7, 12, 27, 30, 31, 32 and 37; Vat Red 74; 3,6-di(3',4'-dichloro-phenyl)-2,5-dihydro-pyrrolo[3,4-c]pyrrole-1,4-dione, 3,6-di(4'-cyano-phenyl)-2,5-dihydro-pyrrolo[3,4-c]pyrrole-1,4-dione and 3-phenyl-6-(4'-tert-butyl-phenyl)-2,5-dihydro-pyrrolo[3,4-c]pyrrole-1,4-dione; and mixtures and solid solutions thereof.

The resin may be a resin or binder conventionally employed in ink, coating, plastic and other applications (including masterbatches), or a resin compatible with the other usual components of these applications. Examples of resins suitable for oil-based inks are rosin, the principal component of which is abietic acid; chemically modified rosins such as hydrogenated, dehydrogenated or disproportionated rosin; dimerised or polymerized rosin; esterified rosin; non-esterified rosin or partially esterified rosin; maleic or phenolic modified rosins; rosin amines; alkyd resins; hydrocarbon resins; nitrocellulose; polyamide; polystyrene or epoxy resin; thermoplastic resins; and mixtures of two or more thereof. Resins particularly suitable for aqueous inks are water-compatible, such as for example acrylic resins.

Illustrative rosins include commercially available materials such as Staybelite™ Resin-E (hydrogenated rosin), esterified rosin derivatives, Recoldis™ A resin (disproportionated rosin), Dymerex™ resin (dimerised rosin) and rosin amine D (dehydroabietyl amine). Preferred are hydrogenated, phenolic-modified rosins and maleic-modified rosins.

Further resins, which are most suitable for coatings applications, are for example acrylic, alkyd (with and without melamine), epoxy (esterified or not), phenolic, melamine, urea, polyester, polyurethane, silicone, styrene, vinyl, blocked isocyanate, benzoguanamine, cellulose ester, aldehyde or ketone based resins, or copolymers or combinations thereof, such as long or short-chain alkyds, both modified and non modified, or styrene copolymers with alkyds, methacrylates, polyvinyl acetate or chloride, or with butadiene. Especially useful are the commercially available resins of the Laropal® range (BASF).

Even further resins, which are most suitable for plastics applications, are polyolefins, plasticised or rigid PVC, polystyrenes, acrylonitrile butadiene styrene, polycarbonates, terephthalates such as poly(ethylene terephthalate), poly(butylene terephthalate), polymethacrylates such as polymethyl methacrylate, polyacrylates, polyamides, polyoxymethylene acetal and rubbers.

The $C_{10}$-$C_{18}$ alcohol, most preferably a $C_{12}$-$C_{14}$ alcohol, can be aliphatic or alicyclic, linear or branched, and saturated or partially insaturated. Preferably it is linear, aliphatic and/or saturated. Suitable alcohols are for example 1-decanol (laurin alcohol), 1-undecanol, 1-dodecanol (lauryl alcohol), 2,6,8-trimethyl-4-nonanol, 1-tridecanol, 1-tetradecanol (myristyl alcohol), 1-pentadecanol (pentadecyl alcohol), 1-hexadecanol (cetyl alcohol), 1-heptadecanol (margaryl alcohol), 1-octadecanol (stearyl alcohol), 10-undecen-1-ol, cis-9-octadecen-1-ol (oleyl alcohol), trans-9-octadecen-1-ol (elaidyl alcohol) and 4-ethyl-1-octyn-3-ol,as well as glycols and glycol ethers, such as 1,10-decanediol, 1,12-dodecanediol, 6-butoxy-1-hexanol, 3,6-dioxa-1-dodecanol and other polyethylene or polypropylene glycols and glycol ethers with the adequate number of carbon atoms. Preferred are mono alcohols, especially those with only one or no ether groups. Most preferred are 1-dodecanol, 1-tridecanol, isomeric mixtures of dodecanols, isomeric mixtures of tridecanols and homologue mixtures comprising dodecanol and/or tridecanol as main component.

Suitable liquid hydrocarbons have at least 6, preferably at least 8 carbon atoms, most preferred at least 12 carbon atoms, and they can be linear, branched and/or cyclic, and fully saturated or partially insaturated with up to about 25% insaturated or aromatic bonds. Most preferably, the number of insaturated or aromatic bonds is from 0 to 5%. Liquid hydrocarbons are preferably used as mixtures of isomers and/or homologues, in which case the above number of carbon atoms is applicable for the weight average of the mixture (determined for example by HPLC) and the above number of insaturated and/or aromatic bonds is applicable for the molar average in the mixture (determined for example by $^{13}$C-NMR spectroscopy, 25% multiple bonds corresponding to one of four carbon atoms at a multiple bond).

The hydrocarbon should be liquid at the dry-milling temperature, which is preferably from 20 to 80° C. Thus, the liquid hydrocarbon has adequately a melting point of 80° C. or below, preferably a melting point of 20° C. or below. Examples are aliphatic hydrocarbons such as cyclohexane, methylcyclohexane, heptane, octane, decalin, dodecane and higher homologues commonly called boiling range petrol, petroleum ether, ligroin, mineral oil or also simply printing ink distillate. Such commercially available mixtures of technical grade usually comprise no or only minor amounts of insaturated and/or aromatic bonds as indicated above. Higher aromatic or insaturated hydrocarbons with melting points above 80° C. such as, for example, naphthalene, fluorene, terphenyl or β-carotene are unsuitable. The liquid hydrocarbon has preferably a boiling point of from 100 to 350° C. at $10^5$ Pa, more preferably a boiling point of from 150 to 350° C. at $10^5$ Pa.

The amount of liquid hydrocarbon is preferably from 0 to 1.2 parts by weight per part by weight of $C_{10}$-$C_{18}$ alcohol. Above weight limits refer to the total of both.

Further components are for example additives such as dyestuffs, dispersants, rheology improvers, phase directors or stabilizers, UV stabilizers, antioxidants, antiozonants, processing stabilizers, lubricants, platicizers, fillers, etc., for example polymeric hyperdispersants such as derivatives of 12-hydroxy stearic acid or of aliphatic sulfonates, or pigment derivatives such as phthalimidomethyl, 3,5-dimethylpyrazolylmethyl, N-saccharinomethyl, sulfo-naphthylmethyl, di-$C_1$-$C_4$alkylamino and amino methyl substituted and/or sulphonated pigments or pigment derivatives and their amine salts, and mixtures thereof. The most suitable pigment derivatives are derivatives of polycyclic and heterocyclic pigments, such as phthalocyanines, isoindolinones, indanthrones, flavanthrones, quinacridones (including dihydroquinacridones and quinacridonequinones), aminoanthraquinones, dioxazines, 1,4-diketo-3,6-diaryl-pyrrolo[3,4-c]pyrroles and perylenes.

Usual plastics additives such as UV stabilizers, antioxidants, antiozonants, processing stabilizers and lubricants are well-known to the skilled artisan and described for example in the Plastics Additives Handbook, 5$^{th}$ Edition 2001 (ISBN 3-446-21654-5), the contents of which are incorporated herein by reference. Plasticizers may for example be sebacates and azelates, such as dibutyl sebacate, esters such as benzyl benzoate, adipates such as dioctyladipate, citrates such as triethylcitrate, epoxies, phosphate esters such as 2-ethylhexyl diphenyl phosphate, phthalates such as dioctylphthalate, trimellitates such as trioctyl trimellitate and secondary plasticisers such as chlorinated paraffins.

It is preferred though optional to use a pigment derivative of the same pigment class as the pigment, for example quinacridone derivatives for quinacridone pigments, dioxazine derivatives for dioxazine pigments, diketopyrrolopyrrole derivatives for diketopyrrolopyrrole pigments, perylene derivatives for perylene pigments and phthalocyanine derivatives for phthalocyanine pigments. Phthalocyanine derivatives obtained from unsubstituted or halogenated phthalocyanines are especially useful as additives for phthalocyanine pigments, in particular the phthalimidomethyl, dimethylamino, amino methyl and/or sulfo derivatives.

Further other components can for example be water or other liquids, such as phase directors, this short list, however, being by no means exhaustive. In this case, however, the amount of other liquids, and in particular the amount of water, should be <2% by weight, based on the weight of the pigment. Otherwise, there is a risk of impeding the effect of the $C_{10}$-$C_{18}$ alcohol and/or liquid hydrocarbon having a boiling point higher than 80° C. at $10^5$ Pa in the instant composition's particles.

Amongst the liquids which may be used are one or more of the following ones, commonly called solvents but which in the instant case do not dissolve the pigment nor necessarily the resin: alcohols such as methanol, ethanol, propanols, butanols and $C_2$-$C_8$ glycols or $C_4$-$C_8$ polyglycols, aromatic hydrocarbons such as toluene and xylene, heterocycles such as pyridine, quinoline, isoquinoline and 1-hydroxyethyl-2-heptydecyl-2-imidazolin (Amine O™), linear or branched amines such as tri-ethanol amine, Primene TOA™ ($C_8$), Primene 81-R™ ($C_{12\text{-}14}$) and Primene JM-T™ (each Rohm and Haas, Philadelphia/US), aliphatic carboxylic acids such as acetic acid, propionic acid, butyric acid, hexanoic acid, n-octanoic acid, 2-ethylhexanoic acid, nonanoic acid, decanoic acid, lauric acid, myristic acid, palmitic acid, stearic acid and oleic acid, esters such as methyl acetate, ethyl acetate, isopropyl acetate, isobutyl acetate, n-butyl acetate, tert-butyl acetate, amyl acetate and 2-ethoxyethyl acetate, glycol ethers such as 2-ethoxyethanol and 2-n-butoxyethanol, ketones such as methyl ethyl ketone, methyl isobutyl ketone and cyclohexanone, amides such as dimethylformamide, diethylformamide, acetamide, dimethylacetamide, diethylacetamide and 2-methyl-1-pyrrolidone, sulfur compounds such as dimethylsulfoxide and sulfolane, and carbonates such as diethyl carbonate or ethylene carbonate, as well as any mixtures thereof.

The instant compositions preferably consist essentially of only the components listed above.

The amount of $C_{10}$-$C_{18}$ alcohol is preferably at least 1% by weight, more preferably at least 2% by weight, based on the weight of the composition. With particular preference, the amount of $C_{10}$-$C_{18}$ alcohol is at least equal to the amount of liquid hydrocarbon, especially at least 2% by weight, based on the weight of the composition, higher than the total amount of optional liquid hydrocarbon and optional further components with the exception of solvents having a higher polarity than the $C_{10}$-$C_{18}$ alcohol. The polarity of solvents can suitably be compared on the basis of their dipole moment at 25±5° C.

Hence, the invention also pertains to a pigment composition comprising
- from 75 to 95% by weight, preferably from 78 to 95% by weight, most preferred from 80 to 95% by weight, based on the weight of the composition, of a pigment;
- from 0 to 20% by weight, preferably from 5 to 18% by weight, based on the weight of the composition, of a resin;
- the total of pigment and resin being from 85 to 98% by weight of the composition;
- from 1 to 15% by weight, preferably at least 2% by weight, most preferred from 5 to 15% by weight, based on the weight of the composition, of a $C_{10}$-$C_{18}$ alcohol, preferably a $C_{12}$-$C_{14}$ alcohol,
- optionally from 0 to 13% by weight, based on the weight of the composition, of a liquid hydrocarbon; and
- optionally from 0 to 8% by weight, based on the weight of the pigment, of further components.

The instant compositions exhibit excellent properties as described above in the introduction. The particles are not agglomerated and can usually be handled just like solid pigments and pigment preparations, while significantly less dusting. In general, the powder is free-flowing so that it can advantageously be, for example, scooped or transported with a conveyor belt. There are less losses and cleaning is much easier than with the prior art pastes and non-resinated pigment powders. Coarse or fine particles can advantageously be obtained if desired by routine variations of the process conditions.

The instant compositions can be made directly from crude pigments through a simple 2- or 3-step process comprising dry-milling, blending and wet-shearing. Additional steps are possible but generally superfluous. Hence, the invention also pertains to a process for making a pigment composition, comprising the steps of
a) milling a crude pigment in the optional presence of from 0 to 25% by weight, preferably from 5 to 20% by weight, based on the weight of the crude pigment, of a resin, and/or from 0 to 20% by weight, preferably from 5 to 15% by weight, based on the weight of the crude pigment, of a $C_{10}$-$C_{18}$ alcohol, a liquid hydrocarbon having a boiling point higher than 80° C. at $10^5$ Pa, and/or of further components, thus obtaining a millbase;
b) optionally blending said millbase with resin, $C_{10}$-$C_{18}$ alcohol, liquid hydrocarbon having a boiling point higher than 80° C. at $10^5$ Pa and/or further components, or further quantities of any thereof, thus obtaining a blend; and
c) submitting the millbase from a) or the blend from b) each comprising
  - from 75 to 95% by weight, preferably from 78 to 95% by weight, most preferred from 80 to 95% by weight, based on the weight of the composition, of a pigment;
  - from 0 to 20% by weight, preferably from 5 to 18% by weight, based on the weight of the composition, of a resin;
  - the total of pigment and resin being from 85 to 98% by weight of the composition; and
  - from 1 to 15% by weight, preferably from 2 to 15% by weight, most preferably from 5 to 15% by weight, based on the weight of the composition, of a $C_{10}$-$C_{18}$ alcohol, a liquid hydrocarbon having a boiling point higher than 80° C. at $10^5$ Pa, or both a $C_{10}$-$C_{18}$ alcohol and a liquid hydrocarbon having a boiling point higher than 80° C. at $10^5$ Pa to a shear gradient of from 500 to 3000 s$^{-1}$, preferably from 800 to 1700 s$^{-1}$, in a device of interior superficial temperature from 0 to 180° C., especially up to 140° C., preferably from 20 to 100° C., more preferred from 20 to 60° C.

Most suitable devices are means for kneading, in particular batch kneaders and extruders, for example single screw, planetary rolls or especially twin-screw extruder with counter- or preferably with co-rotating screws, or Sigma kneaders. Further devices may also be used, provided the energy input remains in the range specified below, for example edge or pan mills.

The crude pigments used as starting materials for step a) are generally in the form of particles too coarse to fully develop their coloristic properties, for example with a particle size of from 1 to 500 µm, preferably from 2 to 200 µm, most preferred from 5 to 100 µm. These coarse crude particles can either be primary particles, or also aggregates of smaller particles. They are generally obtained industrially, either through purification of natural materials, such as bio-organic masses, minerals or ores, or preferably synthetically according to well-known processes. This is for example the case of crude copper phthalocyanine prepared by any of the well established processes, such as reaction at elevated temperature of phthalic anhydride with urea and a copper salt in the presence of a catalytic amount of a transition metal compound such as ammonium molybdate, the reaction being carried out in a high boiling aromatic solvent such as nitrobenzene or in the absence of a solvent in a "dry-bake" melt process. Standard processes for the production of crude copper phthalocyanine are detailed in "Phthalocyanine Compounds" by Moser and Thomas, Rheinhold Publishing Corporation 1963, the disclosures of which are incorporated herein by reference.

Optionally, the crude pigment can be a mixture of pigments comprising at least one crude pigment and if desired one or more other pigments of smaller particle size, for example from 0.001 to 1 µm average particle size.

Milling is a process by which the solids are subject to mechanical means of achieving particle size reduction, such as attrition or grinding. Step a) consists essentially of dry-milling, which is understood to be milling under such conditions that the millbase essentially retains the properties of a powder, such as free flow and substantial absence of a liquid phase. However, the powder may be wetted by a low level of solvent as long as its properties are not significantly affected. The skilled artisan will undoubtedly understand that the amounts of resin, $C_{10}$-$C_{18}$ alcohol, liquid hydrocarbon having a boiling point higher than 80° C. at $10^5$ Pa and optionally further components depend on each other, so that the amount of crude pigment remains no lower than 75% by weight, preferably no lower than 78% by weight, most preferred no lower than 80% by weight.

It is further desirable to avoid caking of the mixture in step a) though such problem generally does not arise with the instant small amounts of $C_{10}$-$C_{18}$ alcohol and/or liquid hydrocarbon having a boiling point higher than 80° C. at $10^5$ Pa. Avoiding caking can be achieved simply by means well-known in the art, such as the choice of a resin having a softening point below the dry-milling temperature, reducing the amount of components which are liquid at the dry-milling temperature, and/or cooling. When a resin is used in the step a), it is preferably used in particulate form. Suitable equipment for dry-milling may for example be a rotating or vibrating ball mill, each working either batchwise or continuously, or a jet- or high-speed mill.

The dry-milled pigment has suitably an average particle size of less than half the particle size of the crude pigment, so that the particles have surfaces freshly broken thus activated. Preferably, the dry-milled pigment has an average particle size of from 0.001 to 4 μm, more preferably from 0.01 to 1.5 μm, most preferred from 0.03 to 0.8 μm. The particle size of both the crude and the dry-milled pigment can be determined for example by laser diffraction, which method generally gives results in good correlation with electron and optical microscopy while avoiding the problem of selecting a representative sample. The average is meant by weight of the fractions.

The dry-milling step a) may also induce a partial or complete transformation of the crude pigment into a particular crystal phase, which transformation is generally beneficial. Especially quinacridones and diketopyrrolopyrroles, but also some other pigment classes, lead to the formation of solid solutions or mixed crystals when used in combination of 2 or more chemically different compounds. Such mixed crystals have usually better coloristic characteristics and an X-ray pattern different from the X-ray pattern of the physical mixture, but sometimes identical to the X-ray pattern of one of the components (single phase solid solution) or of a similar, for example unsymmetrical pigment, examples of which are known from the prior art. In the case of phthalocyanines, dry-milling usually leads to a partial change from the β crystal phase into about from 5 to 65% by weight of the a crystal phase. The a crystal phase is very easily converted into the desired β crystals by the instant process.

From 0 to 8% by weight, based on the weight of the pigment, of further components may also be added in step a) and/or comprised in the blend b), or added separately in step c).

The optional step b) can if desired be performed either at the end of step a) or at the beginning of step c), for example in the first or some of the first mixing zones of an extruder. Each component may if desired be fed separately to the extruder. An extruder may have, for example, 1 to 30 mixing zones, more usually 2 to 20 mixing zones. The energy input to the materials to be extruded may be adjusted by adjusting the screw speed, throughput rate, feedstock composition and/or extruder motor power. The energy input is generally from 0.36 to 21.6 KJ/g (0.1-6 $kW_{int}h/kg$) of extrudate, preferably from 0.72 to 14.4 KJ/g (0.2-4 $kW_{int}h/kg$), more preferably from 1.08 to 10.8 KJ/g (0.3-3 $kW_{int}h/kg$) of extrudate. The necessary time of treatment depends on the desired energy input, the amount of blend to be treated and the efficiency of the means for kneading, from which parameters it can be calculated.

The temperature and energy input are independent from the type of device and should be set to the same values also in other devices, such as batch or Sigma kneaders and edge or pan mills. However, in such case the mixing zones are determined by the device geometry and the sequence and spots of addition of the components, which are of course as variable as in the case of an extruder.

When any optional component of not negligible volatility (especially such of boiling point of below 80° C. or from 80 to 150° C. at $10^5$ Pa) is present during step c), it is preferred to eliminate it partially or wholly from the composition through evaporation during or after step c). This can be easily done for example through vents in an extruder or in the cover of a kneader in step c), or in an oven, fluidized bed, drying tower, tumbler or any other drying means after step c), preferably under reduced pressure of from 1-$10^5$ Pa, especially from $10^2$-3·$10^4$ Pa. In general, components of boiling point below 80° C., more preferably also such of boiling point below 100° C., most preferred also such of boiling point below 150° C., should preferably substantially be avoided for safety and toxicological reasons.

The product from step c) may optionally be subjected to additional milling and/or sieving steps to obtain a fine powder of desired size distribution. This is much easier and requires less energy than necessary for the prior art extrudate of EP 1 277 808 A2 and advantageously leads to less undesired dust.

Apart of the advantages already mentioned above, it is highly surprising that the pigments obtainable by the instant process are in many cases advantageously isometric with an aspect ratio generally below 5:1, preferably below 2.5:1 for 50% or more of the particles, though no salt is used and a liquid phase for particle growth is absent. Furthermore, the total process time can be kept short, what is economically very advantageous. In general, residence times of about from 10 min to 100 h in the dry-milling step a) and from 1 s to 10 h in the kneading step c) lead to fully satisfactory results. Continuous equipment such as extruders usually require much shorter residence times than batch kneaders for the same result in step c), for example up to only 15 min. Though the residence time is irrelevant in the blending step b), it is generally desirable to keep it as short as possible for cost reasons. The efficiency of processing is high and there are also environmental improvements. The process doesn't involve the use of salt or other grinding aids during milling, therefore, there is no need to wash the product to remove the grinding aids. Most solvents used are high boiling and remain part of the final composition. Accordingly, there is no requirement to wash the product to remove solvent and therefore no solvent recovery step is required. Thus, the overall solvent use and water consumption is much lower than for a conventional process. Additionally, no effluent is generated leading to additional environmental and cost benefits.

The instant compositions can be used for any pigmenting purpose, such as the preparation of masterbatches, inks, coatings, plastics as well as special applications such as toners or colour filters. Hence, the invention also pertains to the use of an instant composition for the preparation of a masterbatch, ink, coating, plastic material, toner or colour filter. Numerous types of inks, coatings, plastics (including composites, fibers, elastomers, thickeners and ion-exchange resins), toners and colour filters (including resists therefor as well as many methods of preparation thereof are well-known in the art, for example from WO 03/035 770, WO 04/050 771 or EP 0 827 039, the contents of which are incorporated herein by reference.

The materials to be pigmented with the instant compositions can optionally be reinforced or in the form of masterbatches, granulates or dispersions.

The instant composition are preferably used for coatings/paints and inks, most preferred for solvent based inks. Printing inks comprise the pigment composition of the invention judiciously in a concentration of from 0.01 to 40% by weight, preferably from 1 to 25% by weight, with particular preference from 5 to 10% by weight, based on the overall weight of the printing ink. They may be used, for example, for gravure printing, flexographic printing, screen printing, offset printing, or continuous or dropwise inkjet printing on paper, board, metal, wood, leather, plastic or textiles, or else in special applications in accordance with formulations which are general knowledge, for example in publishing, packaging or freight, in logistics, in advertising, in security printing or else in the office sector for ballpoint pens, felt-tip pens, fibre-tip pens, inking pads, ink ribbons or inkjet printer cartridges. The pigment concentration is generally the same in other applications.

The examples which follow illustrate the invention, without limiting it ("%", quantities and ratios are by weight where not otherwise specified):

EXAMPLE 1

9000 g of crude copper phthalocyanine are ground in a ball mill until the crystal form of the milled material is 50% α. This ball milled intermediate is supplied to a co-rotating twin screw extruder (APV, Peterborough/GB) together with 1-dodecanol and a hydrogenated resin (Staybelite™ Resin-E, Eastman Chemical Company, Kingsport, Te/US). The ratio of crude copper phthalocyanine to 1-dodecanol to resin is 8.1:1:0.9. The total feedrate is 923 g/h. The extruder's heating is switched off and the barrel temperature is controlled to 30-40° C. using water-cooling. The screwspeed is set at 400 rpm, resulting in a specific energy of 4.93 KJ/g (1.37 kW$_{int}$h/kg). The resulting pigment composition has a copper phthalocyanine content of 81% comprising 95% of the β modification.

EXAMPLE 2

It is proceeded as in Example 1, with the only difference that the components are supplied to the twin screw extruder in a ratio of crude copper phthalocyanine to 1-dodecanol to resin of 8.1:0.5:1.4. The total feedrate is 816 g/h. The resulting specific energy is 5.29 KJ/g (1.47 kW$_{int}$h/kg). The resulting pigment composition has a copper phthalocyanine content of 81% comprising 95% of the β modification.

EXAMPLE 3

8100 g of crude copper phthalocyanine and 900 g of Staybelite™ Resin-E (Eastman Chemical Company, Kingsport, Te/US) are ground in a ball mill until the crystal form of the milled material is 47% α. The ball milled intermediate is supplied to a co-rotating twin screw extruder (APV, Peterborough/GB) together with 1-dodecanol. The ratio of ball milled intermediate to dodecanol is 9:1. The total feedrate is 650 g/h. The extruder's heating is switched off and the barrel temperature is controlled to 30-60° C. using water-cooling. The screwspeed is set at 400 rpm, resulting in a specific energy of 7.71 KJ/g (2.14 kW$_{int}$h/kg). The resulting pigment composition has a copper phthalocyanine content of 81% comprising 95% of the β modification.

EXAMPLE 4

A ball milled intermediate according to the first part of Example 1 is supplied to a batch kneader together with dodecanol and a hydrogenated resin (Staybelite™ Resin-E, Eastman Chemical Company, Kingsport, Te/US). The ratio of crude copper phthalocyanine to 1-dodecanol to resin is 8.1:1:0.9. The kneader has a water jacket, which is supplied with water at 40° C. The kneader is set to a speed of 78 rpm. The total powder charge of 400 g is kneaded for a period of 2½ hours. The resulting pigment composition has a copper phthalocyanine content of 81% comprising 94% of the β modification.

EXAMPLE 5

9000 g of crude copper phthalocyanine are placed in a ball mill and ground to give a ball milled intermediate (BMI). The crystal form of the milled material is 50% α. The BMI is supplied to a co-rotating twin screw extruder (APV, Peterborough) together with a hydrogenated resin and tridecanol in a ratio of BMI to resin to tridecanol of 8.1:0.9:1.0. The total feedrate is 5 kg/h. The barrel temperature of the extruder is set at zero and the temperature is controlled using water-cooling. The barrel temperature is restricted to 0-70° C. and the screwspeed is set at 250 rpm, resulting in a specific energy of 4.25 KJ/g (1.18 kW$_{int}$h/kg). The resulting pigment composition has a copper phthalocyanine content of 81% predominantly in the β modification.

EXAMPLE 6

9000 g of crude copper phthalocyanine are placed in a ball mill and ground to give a ball milled intermediate (BMI). The crystal form of the milled material is 50% α. The BMI is supplied to a co-rotating twin screw extruder (APV, Peterborough) together with a hydrogenated resin, dodecanol and phthalimido-methyl copper phthalocyanine in a ratio of BMI to resin to dodecanol to phthalimido-methyl derivative of 7.6:1.4:0.5:0.5. The total feedrate is 5 kg/h. The barrel temperature of the extruder is set at zero and the temperature is controlled using water-cooling. The barrel temperature is restricted to 0-60° C. and the screwspeed is set at 250 rpm, resulting in a specific energy of 3.82 KJ/g (1.06 kW$_{int}$h/kg). The resulting pigment composition has a chromophore content of 81% predominantly in the β modification.

EXAMPLE 7

9000 g of crude copper phthalocyanine are placed in a ball mill and ground to give a ball milled intermediate (BMI). The crystal form of the milled material is 50% α. The BMI is supplied to a co-rotating twin screw extruder (APV, Peterborough) together with a hydrogenated resin, dodecanol and phthalimido-methyl copper phthalocyanine in a ratio of ratio of BMI to resin to dodecanol to additive of 8.0:0.9:1.0:0.1. The total feedrate is 0.8 kg/h. The barrel temperature of the extruder is set at zero and the temperature is controlled using water-cooling. The barrel temperature is restricted to 0-60° C. and the screwspeed is set at 400 rpm, resulting in a specific energy of 5.08 KJ/g (1.41 kW$_{int}$h/kg). The resulting pigment composition has a chromophore content of 81% predominantly in the β modification.

EXAMPLE 8

9000 g of crude copper phthalocyanine and 1000 g of high molecular weight hydrogenated resin are placed in a ball mill and ground to give a ball milled intermediate (BMI). The crystal form of the milled material is 50% α. The BMI is supplied to a co-rotating twin screw extruder (APV, Peterborough) together with dodecanol in a ratio of BMI to dodecanol of 9.0:1.0. The total feedrate is 10 kg/h. The barrel temperature of the extruder is set at 80° C. and the temperature is controlled to less than 85° C. using water-cooling. The barrel temperature is restricted to 0-85° C. and the screwspeed is set at 400 rpm, resulting in a specific energy of 1.08 KJ/g (0.3 kW$_{int}$h/kg). The resulting pigment composition has a chromophore content of 81% predominantly in the β modification.

EXAMPLE 9

It is proceeded as in Example 2, with the differences that the ratio of crude copper phthalocyanine to resin to 1-dodecanol is 8.1:0.9:1.0, the total feedrate is 10 Kg/h and the barrel temperature is set to 80° C. and controlled to less than 85° C. by water cooling. The screwspeed is set at 300 rpm, resulting in a specific energy of 0.97 KJ/g (0.27 kW$_{int}$h/kg). The resulting pigment composition has a copper phthalocyanine content of 81% predominantly in the β modification.

EXAMPLE 10

2000 g of crude C.I. Pigment Red 254 are ground in a ball mill similarly as in example 1. This ball milled intermediate is supplied to a co-rotating twin screw extruder (APV, Peterborough/GB) together with 1-dodecanol and a polyethylene wax (A-C® 617A, Honeywell). The ratio of crude diketopyrrolopyrrole to 1-dodecanol to polyethylene is 7.9:0.2:1.9. The total feedrate is 1.0 Kg/h. The extruder's heating is switched off and the barrel temperature is controlled to less than 160° C. using water-cooling. The screwspeed is set at 250 rpm, resulting in a specific energy of 1.94 KJ/g (0.54 kW$_{int}$h/kg). The resulting pigment composition has a chromophore content of 79%.

EXAMPLE 11

80 g of crude copper phthalocyanine, 18 g of polypropylene (A-C® 1089, Honeywell) and 2 g of 1-dodecanol are ground in a ball mill until the crystal form of the milled material is 47% α. This process is repeated twice to deliver 300 g of feedstock. This ball milled intermediate is supplied to a co-rotating twin screw extruder (APV, Peterborough/GB) at a total feedrate of 1.23 Kg/h. The extruder's heating is switched off and the barrel temperature is controlled to less than 140° C. using water-cooling. The screwspeed is set at 300 rpm, resulting in a specific energy of 2.12 KJ/g (0.59 kW$_{int}$h/kg). The resulting pigment composition has a copper phthalocyanine content of 80% predominantly of the β modification.

EXAMPLE 12

80 g of crude C.I. Pigment Yellow 110, 18 g of polypropylene (A-C® 1089, Honeywell) and 2 g of 1-dodecanol are ground in a ball mill similarly as in example 1. This process is repeated twice to deliver 300 g of feedstock. This ball milled intermediate is supplied to a co-rotating twin screw extruder (APV, Peterborough/GB) at a total feedrate of 1.0 Kg/h. The extruder's heating is switched off and the barrel temperature is controlled to less than 140° C. using water-cooling. The screwspeed is set at 300 rpm, resulting in a specific energy of 2.52 KJ/g (0.70 kW$_{int}$h/kg). The resulting pigment composition has a chromophore content of 80%.

EXAMPLE 13

2000 g of crude C.I. Pigment Blue 60 are ground in a ball mill similarly as in example 1. This ball milled intermediate is supplied to a co-rotating twin screw extruder (APV, Peterborough/GB) together with a pale aldehyde resin (Laropal® A81, BASF) and 1-dodecanol. The ratio of crude diketopyrrolopyrrole to aldehyde resin to 1-dodecanol is 8.1:1.7:0.2. The total feedrate is 430 g/h. The extruder's heating is switched off and the barrel temperature is controlled to less than 100° C. using water-cooling. The screwspeed is set at 250 rpm, resulting in a specific energy of 3.78 KJ/g (1.05 kW$_{int}$h/kg). The resulting pigment composition has a chromophore content of 81%.

EXAMPLE 14

2000 g of crude copper phthalocyanine are ground in a ball mill until the crystal form of the milled material is 47% α. The ball milled intermediate is supplied to a co-rotating twin screw extruder (APV, Peterborough/GB) together with a pale aldehyde resin (Laropal® A81, BASF) and 1-dodecanol. The ratio of ball milled intermediate to aldehyde resin to dodecanol is 7.9:1.9:0.2. The total feedrate is 610 g/h. The extruder's heating is switched off and the barrel temperature is controlled to less than 110° C. using water-cooling. The screwspeed is set at 250 rpm, resulting in a specific energy of 4.46 KJ/g (1.24 kW$_{int}$h/kg). The resulting pigment composition has a copper phthalocyanine content of 79% predominantly of the β modification.

EXAMPLE 15

2000 g of crude C.I. Pigment Red 122 are ground in a ball mill similarly as in example 1. This ball milled intermediate is supplied to a co-rotating twin screw extruder (APV, Peterborough/GB) together with a pale aldehyde resin (Laropale A81, BASF) and 1-dodecanol. The ratio of crude 2,9-dimethylquinacridone to aldehyde resin to 1-dodecanol is 8.1:1.7:0.2. The total feedrate is 450 g/h. The extruder's heating is switched off and the barrel temperature is controlled to less than 110° C. using water-cooling. The screwspeed is set at 250 rpm, resulting in a specific energy of 2.81 KJ/g (0.78 kW$_{int}$h/kg). The resulting pigment composition has a chromophore content of 81%.

EXAMPLE 16

2000 g of crude C.I. Pigment Red 179 are ground in a ball mill similarly as in example 1. This ball milled intermediate is supplied to a co-rotating twin screw extruder (APV, Peterborough/GB) together with a pale aldehyde resin (Laropal® A81, BASF) and 1-dodecanol. The ratio of crude dimethylperylimide to aldehyde resin to 1-dodecanol is 7.9:1.9:0.2. The total feedrate is 600 g/h. The extruder's heating is switched off and the barrel temperature is controlled to less than 100° C. using water-cooling. The screwspeed is set at 250 rpm, resulting in a specific energy of 4.46 KJ/g (1.24 kW$_{int}$h/kg). The resulting pigment composition has a chromophore content of 79%.

EXAMPLE 17

Preparation of Printing Ink

In a water jacketed stainless steel vessel, the product according to example 1 is premixed at a pigmentation level of 15% in a heatset varnish system at 60° C. using a trifoil impeller at a speed of 1000 rpm for 15 minutes. After this time, the trifoil head is replaced with a nylon disc and 200 g of 1 mm glass beads are added. The temperature is increased to 80° C. and the millbase stirred for 15 minutes at 3000 rpm. The millbase is then letdown to 14% pigmentation using a 11.5:1 blend of varnish and 1-tridecanol. The ink is isolated in a glass jar and allowed to cool. After beadmilling, 100 g of beadmilled ink is transferred to a three roll mill (Bühler SDY200) and premixed on the back rolls for 2 minutes at 10 bar/23° C. The ink is then passed through the mill at 10 bar pressure, 23° C. and a homogeneous sample taken from the apron. Assessment of the properties of the heatset oil ink are obtained by printing using a Prüfbau® printing machine to give prints with differing film weights. The print density for each print (at different film weight) is measured using a densitometer. Gloss is also measured at equal film weight. Dispersion is determined by visual assessment of the ink versus a standard at 100× magnification under a microscope. The quality of the printing ink is also examined visually during triple roll milling. Final ink viscosity is determined on the falling bar Laray viscometer, for example according to ASTM D4040 or ISO 12644 [1996]. Low shear flow is determined by the glass plate technique at 60° angle. The dispersibility, tinctorial strength, gloss development and flowability are excellent in comparison with conventionally processed β copper phthalocyanine pigments (C.I. Pigment Blue 15:3).

EXAMPLES 18-25

It is proceeded as in Example 17, with the difference that the products according to Examples 2, 3, 4, 5, 6, 7, 8 and 9 are each used instead of the product of example 1. The dispersibility, tinctorial strength, gloss development and flowability are in each case excellent in comparison with conventionally processed β copper phthalocyanine pigments (C.I. Pigment Blue 15:3).

EXAMPLES 26-27

It is proceeded as in Example 17, with the difference that the products according to Examples 10 and 12 are each used instead of the product of example 1. The dispersibility, tinctorial strength, gloss development and flowability are in each case excellent in comparison with conventionally processed pigments.

EXAMPLES 28-32

Preparation of a Paint System

Pigment is weighed into a glass jar containing 2 mm glass beads. An alkyd melamine resin system in aromatic hydrocarbons is added to deliver a pigmentation level of 2%. The jar is then placed on a Skandex® mixer to disperse for 30 minutes-8 hours (depending on the pigment class). The dispersion is then filtered through a gauze strainer to remove the beads and a drawdown prepared of the full shade paint using a 100 μm wet film thickness meter bar coater onto a white high-gloss cast-coated card (Astralux™, Favini IT/NL) with black overstripe. A 1:10 (dry weight) pigment: $TiO_2$ reduction of the thus obtained full shade paint and white base is prepared by homogenizing for 10 minutes on the Skandex™. A drawdown of the tint is prepared using a 100 μm wet film thickness meter bar coater onto a white high-gloss cast-coated card. After each of the above illustrations are allowed to flash off for 30 minutes at 23° C., the paint film is cured for 30 minutes at 120° C. The full shade and tint illustrations are measured for colouristics and transparency using a spectrophotometer with CIE L*a*b* software. The pigment compositions of examples 9, 13, 14, 15 and 16 all show excellent tinctorial strength compared to conventionally processed pigments, however, with superior properties and a much higher efficiency of processing as well as environmental improvements.

EXAMPLE 33

Preparation of Another Paint System

Pigment according to example 9 is weighed into a glass jar containing 2.3-2.6 mm glass beads. A long oil alkyd resin system in aliphatic hydrocarbons is added to deliver a pigmentation level of 13%. The jar is then placed on a Skandex™ mixer to disperse for 30 minutes. The dispersion is filtered through a gauze strainer to remove the beads and then letdown to 9% using further long oil alkyd resin system and driers. A drawdown is then prepared of the full shade paint using a 100 μm wet film thickness meter bar coater onto a white high-gloss cast-coated card with black overstripe. A 1:10 (dry weight) pigment: $TiO_2$ reduction of the thus obtained full shade paint is prepared by diluting with white base. The preparation is dispersed for 10 minutes on the Skandex™ and a drawdown of the tint is prepared using a 100 μm wet film thickness meter bar coater onto a white high-gloss cast-coated card. Each of the above illustrations are allowed to cure at 23° C. The full shade and tint illustrations are measured for colouristics and transparency using a spectrophotometer with CIE L*a*b* software. The excellent tinctorial strength is excellent as compared to conventionally processed β copper phthalocyanine pigments, however, with superior properties and a much higher efficiency of processing as well as environmental improvements.

EXAMPLE 34

Preparation of HDPE Samples 0.12 g of pigment according to example 9 is weighed into a polyethylene beaker containing 40 g of HDPE. The pigment is mixed into the HDPE using a spatula. The blend is placed on a 2-roll mill at 150° C. with a nip gap of 0.6 mm and milled for 10 minutes. The full tone HDPE sheets produced are pressed out at 160° C. 0.2 g of pigment according to example 9 and 2 g of titanium dioxide are weighed into a polyethylene beaker containing 40 g of HDPE. The pigments are mixed into the HDPE using a spatula. The blend is placed on a 2-roll mill at 150° C. with a nip gap of 0.6 mm and milled for 10 minutes. The white reduced HDPE sheets are pressed out at 160° C. After cooling to 23° C., all sheets are assessed against a standard. The dispersion is assessed at 25× magnification under a microscope and the colouristic properties are assessed visually or using a colourimeter. The properties are excellent as compared to conventionally processed β copper phthalocyanine pigments.

EXAMPLES 35-57

Examples 33 and 34 are repeated, with the difference that the pigment according to example 9 is replaced by the pigments according to examples 1, 2, 3, 4, 5, 6, 7, 8, 13, 14, 15 and 16 in example 33 and by the pigments according to examples 1, 2, 3, 4, 5, 6, 7, 8, 10, 11 and 12 in example 34, respectively. The properties are excellent as compared to conventionally processed pigments, however, with superior properties and a higher efficiency of processing as well as environmental improvements.

EXAMPLES 58-171

Examples 1 to 57 are repeated, with the difference that 35% of the long chain alcohol (examples 58-114) or the whole of it (examples 115-171) is replaced by the same quantity of an aromatic free petroleum distillate of boiling range 230-290° C., with excellent results. The barrel temperature and screwspeed may also be varied in order the specific energy to remain in the preferred range.

The invention claimed is:

1. A composition comprising
   from 75 to 95% by weight, based on the weight of the composition, of a pigment having a particle size of from 0.01 to 1.5 µm;
   from 0 to 20% by weight, based on the weight of the composition, of a resin;
   the total of pigment and resin being from 85 to 98% by weight of the composition; and
   from 1 to 15% by weight, based on the weight of the composition, of a $C_{10}$-$C_{18}$ alcohol, a liquid hydrocarbon having a boiling point higher than 80° C. at $10^5$ Pa, or both a $C_{10}$-$C_{18}$ alcohol and a liquid hydrocarbon having a boiling point higher than 80° C. at $10^5$ Pa
   wherein the composition is a paste or powder.

2. A composition according to claim 1, comprising
   from 75 to 95% by weight, based on the weight of the composition, of a pigment having a particle size of from 0.01 to 1.5 µm;
   from 0 to 20% by weight, based on the weight of the composition, of a resin;
   the total of pigment and resin being from 85 to 98% by weight of the composition;
   from 1 to 15% by weight, based on the weight of the composition, of a $C_{10}$-$C_{18}$ alcohol,
   optionally from 0 to 13% by weight, based on the weight of the composition, of a liquid hydrocarbon; and
   optionally from 0 to 8% by weight, based on the weight of the pigment, of further components.

3. A composition according to claim 1, wherein the pigment is a 1-amino-anthraquinone, anthanthrone, anthrapyrimidine, disazo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone or thioindigo pigment.

4. A composition according to claim 1, wherein the $C_{10}$-$C_{18}$ alcohol is a $C_{12}$-$C_{14}$ alcohol, selected from the group consisting of 1-dodecanol, 1-tridecanol, isomeric mixtures of dodecanols, isomeric mixtures of tridecanols and homologue mixtures comprising dodecanol and/or tridecanol as main component.

5. A composition according to claim 1, wherein the liquid hydrocarbon having a boiling point higher than 80° C. at $10^5$ Pa has at least 8 carbon atoms, and is fully saturated or partially unsaturated with up to about 25% unsaturated or aromatic bonds.

6. A composition according to claim 1, wherein the resin is selected from the group consisting of rosin, hydrogenated, dehydrogenated or disproportionated rosin; dimerised or polymerized rosin; esterified rosin; non-esterified rosin or partially esterified rosin; maleic or phenolic modified rosins; rosin amines; alkyd resins; hydrocarbon resins; nitrocellulose; polyamide; polystyrene or epoxy resin; thermoplastic resins; and mixtures of two or more thereof.

7. A composition according to claim 1, wherein the resin is selected from the group consisting of acrylic, alkyd, epoxy, phenolic, melamine, urea, polyamide, polycarbonate, polyester, polyolefin, polyoxymethylene acetal, polyurethane, silicone, styrene, terephthalate, vinyl, blocked isocyanate, benzoguanamine, cellulose ester, aldehyde and ketone based resins, rubbers and copolymers and combinations thereof.

8. A composition according to claim 1, comprising
   from 78 to 95% by weight, based on the weight of the composition, of a pigment having a particle size of from 0.01 to 1.5 µm;
   from 5 to 18% by weight, based on the weight of the composition, of a resin;
   the total of pigment and resin being from 85 to 98% by weight of the composition; and
   from 2 to 15% by weight, based on the weight of the composition, of a $C_{10}$-$C_{18}$ alcohol, a liquid hydrocarbon having a boiling point higher than 80° C. at $10^5$ Pa, or both a $C_{10}$-$C_{18}$ alcohol and a liquid hydrocarbon having a boiling point higher than 80° C. at $10^5$ Pa.

9. A composition according to claim 1, comprising
   from 80 to 95% by weight, based on the weight of the composition, of a pigment having a particle size of from 0.01 to 1.5 µm;
   from 5 to 18% by weight, based on the weight of the composition, of a resin;
   the total of pigment and resin being from 85 to 98% by weight of the composition; and
   from 5 to 15% by weight, based on the weight of the composition, of a $C_{10}$-$C_{18}$ alcohol a liquid hydrocarbon having a boiling point higher than 80° C. at $10^5$ Pa, or both a $C_{10}$-$C_{18}$ alcohol and a liquid hydrocarbon having a boiling point higher than 80° C. at $10^5$ Pa.

10. A composition according to claim 2, comprising
    from 78 to 95% by weight, based on the weight of the composition, of a pigment having a particle size of from 0.01 to 1.5 µm;
    from 5 to 18% by weight, based on the weight of the composition, of a resin;
    the total of pigment and resin being from 85 to 98% by weight of the composition;
    from 1 to 15% by weight, based on the weight of the composition, of a $C_{12}$-$C_{14}$ alcohol,
    from 0 to 13% by weight, based on the weight of the composition, of a liquid hydrocarbon; and
    from 0 to 8% by weight, based on the weight of the pigment, of further components.

11. A composition according to claim 2, comprising
    from 80 to 95% by weight, based on the weight of the composition, of a pigment having a particle size of from 0.01 to 1.5 µm;
    from 5 to 18% by weight, based on the weight of the composition, of a resin;
    the total of pigment and resin being from 85 to 98% by weight of the composition;
    from 5 to 15% by weight, based on the weight of the composition, of a $C_{10}$-$C_{18}$ alcohol,
    from 0 to 13% by weight, based on the weight of the composition, of a liquid hydrocarbon; and
    from 0 to 8% by weight, based on the weight of the pigment, of further components.

12. A composition according to claim 4, wherein the liquid hydrocarbon having a boiling point higher than 80° C. at $10^5$ Pa has at least 12 carbon atoms.

13. A composition according to claim 3, wherein the pigment is a disazo, unsubstituted phthalocyanine, partially halogenated phthalocyanine, quinacridone, dioxazine, 1,4-diketo-3,6-diaryl-pyrrolo [3,4-c]pyrrole, indanthrone, isoindolinone or perylene pigment.

14. A masterbatch, ink, coating, plastic material, toner or colour filter containing a composition according to claim 1.

15. A process for making a pigment composition, comprising the steps of
   a) milling a crude pigment having a particle size of from 1 to 500 μm in the presence of from 0 to 25% by weight, based on the weight of the crude pigment, of a resin, and/or from 0 to 20% by weight, based on the weight of the crude pigment, of a $C_{10}$-$C_{18}$ alcohol, a liquid hydrocarbon having a boiling point higher than 80° C. at $10^5$ Pa, and/or of further components, thus obtaining a millbase wherein the pigment thus milled has an average particle size of from 0.001 to 4 μm;
   b) optionally blending said millbase with resin, $C_{10}$-$C_{18}$ alcohol, liquid hydrocarbon having a boiling point higher than 80° C. at $10^5$ Pa and/or further components, or further quantities of any thereof, thus obtaining a blend; and
   c) submitting to a shear gradient of from 500 to 3000 $s^{-1}$ via kneading or extrusion the millbase from a) or the blend from b) each comprising
      from 75 to 95% by weight, based on the weight of the composition, of the pigment;
      from 0 to 20% by weight, based on the weight of the composition, of a resin;
      the total of pigment and resin being from 85 to 98% by weight of the composition; and
      from 1 to 15% by weight, based on the weight of the composition, of a $C_{10}$-$C_{18}$ alcohol, a liquid hydrocarbon having a boiling point higher than 80° C. at $10^5$ Pa, or both a $C_{10}$-$C_{18}$ alcohol and a liquid hydrocarbon having a boiling point higher than 80° C. at $10^5$ Pa in a device of interior superficial temperature from 0 to 180° C.

16. A process according to claim 15, wherein step c) is performed in an extruder or a batch kneader.

17. A process according to claim 15, wherein in step a) the crude pigment is milled in the presence of from 5 to 20% by weight, based on the weight of the crude pigment, of a resin, and/or from 5 to 15% by weight, based on the weight of the crude pigment, of a $C_{10}$-$C_{18}$ alcohol, a liquid hydrocarbon having a boiling point higher than 80° C. at $10^5$ Pa, and/or of further components.

18. A process according to claim 15, wherein the milled pigment from step a) has an average particle size of from 0.01 to 1.5 μm.

19. A process according to claim 15, wherein the pigment is a 1-aminoanthraquinone, anthanthrone, anthrapyrimidine, disazo, azomethine, quinacridone, quinacridonequinone, quinophthalone, dioxazine, diketopyrrotopyrrole, flavanthrone, indanthrone, isoindoline, isoindolinone, isoviolanthrone, perinone, perylene, phthalocyanine, pyranthrone or thioindigo pigment.

20. A process according to claim 19, wherein the pigment is a disazo, unsubstituted phthalocyanine, partially halogenated phthalocyanine, quinacridone, dioxazine, 1,4-diketo-3,6-diaryl-pyrrolo [3,4-c]pyrrole, indanthrone, isoindolinone or perylene pigment.

* * * * *